Figure 1:
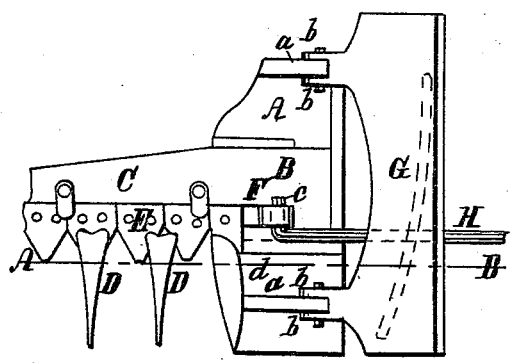
Figure 2:
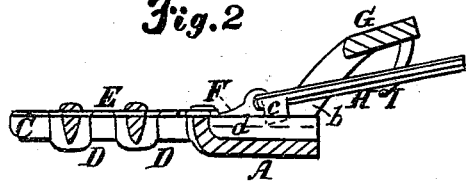
Figure 3:

stop-plates G and tentering-blocks $f$, substantially as and for the purposes set forth.

8. The combination of the feed-cylinder D D', tentering-blocks $f$, intermediate feed-roll E', with points arranged radially, and cloth-disks L, substantially as shown and described.

9. The combination, with the feed-rolls E E', feed-cylinder D D', and stretcher-blocks $f$, of the guides $d\ d$, all constructed substantially as and for the purposes set forth.

10. A drying and tentering-machine, the parts of which are all constructed and combined together for joint operation, substantially in the manner shown and described.

ANDRE AVERY.

Witnesses:
THOS. H. DODGE,
CHAS. H. BURLEIGH.

A. BROWN.
Harvester Cutter.

No. 94,167.  Patented Aug. 24, 1869.

Witnesses:  Inventor: